United States Patent
Mennen

[15] 3,663,185
[45] May 16, 1972

[54] METHOD AND APPARATUS FOR DESENSITIZING CHARCOAL BRIQUETTE FINES

[72] Inventor: Frederick C. Mennen, Michigan City, Ind.

[73] Assignee: United States Packaging Corporation, LaPorte, Ind.

[22] Filed: Apr. 2, 1970

[21] Appl. No.: 25,156

[52] U.S. Cl. .................................................44/2, 44/12
[51] Int. Cl. ..............................................C10l 5/24
[58] Field of Search.........................44/2, 10–13, 28–31; 34/65, 66, 236

[56] References Cited

UNITED STATES PATENTS

| 1,985,512 | 12/1934 | Maurel | 44/2 X |
| 1,312,173 | 8/1919 | Gerlach et al. | 44/2 |
| 2,310,748 | 2/1943 | Pearson | 44/13 X |

Primary Examiner—C. F. Dees
Attorney—Oltsch & Knoblock

[57] ABSTRACT

The method and apparatus for desensitizing charcoal briquette fines produced during drying of the briquettes which includes supporting the briquettes during the drying cycle upon means having openings therein through which said fines may fall. Providing a receptacle filled with a material which, upon contact with the fines, causes the desensitizing thereof. Positioning the receptacle under the briquette support means so as to catch the fines as they are dislodged from the briquettes and fall through the openings in the support means.

9 Claims, 4 Drawing Figures

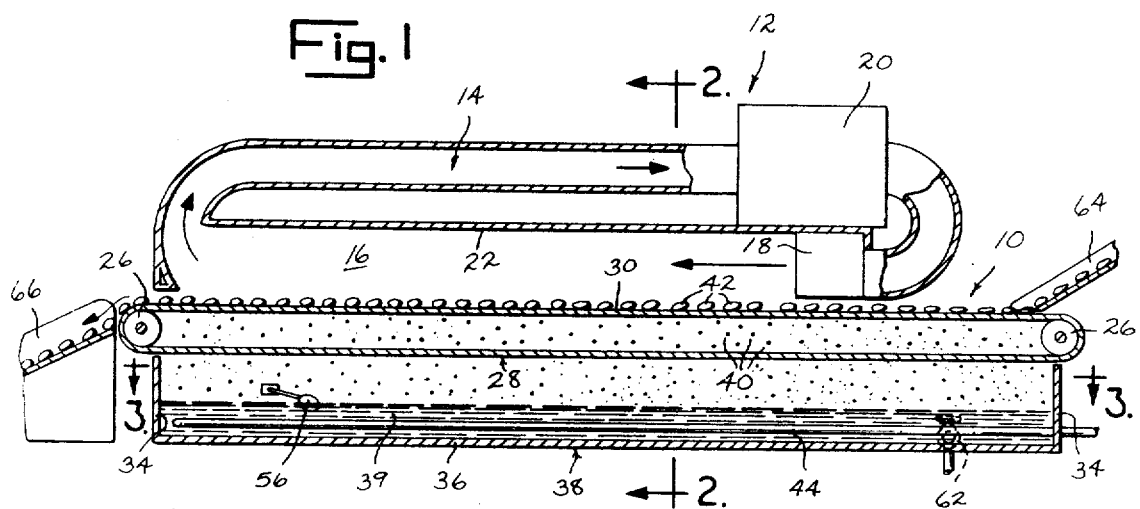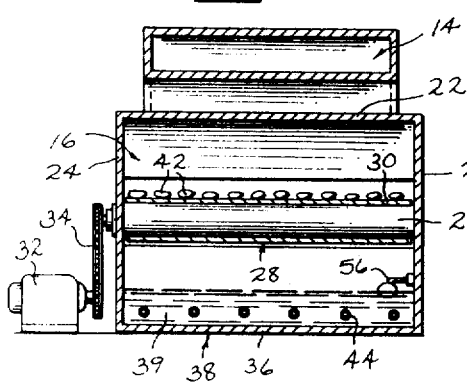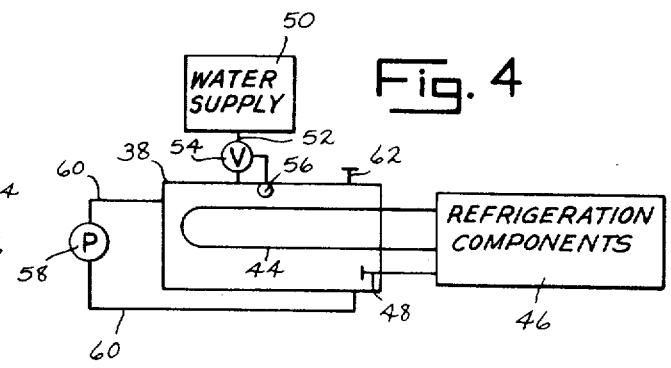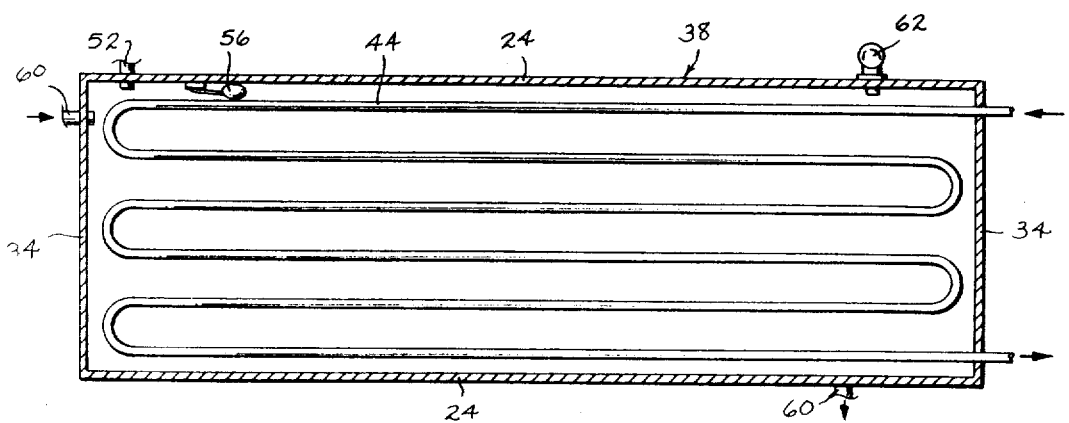
INVENTOR.
FREDERICK C. MENNEN
BY Oltsch & Knoblock
ATTORNEYS 3,663,185

METHOD AND APPARATUS FOR DESENSITIZING CHARCOAL BRIQUETTE FINES

SUMMARY OF THE INVENTION

This invention relates to a method and apparatus for desensitizing and collecting charcoal briquette fines which are produced during the drying process of manufacturing charcoal briquettes.

In manufacturing charcoal briquettes, the briquettes are first molded into shape and then placed within an oven, generally of the forced air type, and dried. One commonly used method of drying the briquettes is to place the newly molded briquettes upon a conveyor which passes through the oven and carries the dried briquettes to a boxing or bagging area. During the passage of the briquettes through the drying oven, small particles known as burrs or fines become dislodged from and flake off of the molded briquettes. These fines collect on the floor of the oven where they remain during operation of the oven. Heat from the oven is absorbed by these fines which become highly susceptible to ignition. Frequently sufficient oxygen is provided by the furnace drying system to ignite the fines and create a fire. This fire hazard created by the accumulation of fines is greatly increased during the drying of those charcoal briquettes which are "instant-igniting" and carry oxidizers. A description of such briquettes may be found in my U.S. Pat. No. 3,385,681.

In this invention, the fire hazard created by the accumulation of fines around the oven area of the briquette drying apparatus is substantially minimized, and for all practical purposes eliminated, by providing the conveyor which transports the briquettes through the oven with openings through which the fines from the briquettes may freely fall. A receptacle containing a desensitizing material, such as water, is positioned below the conveyor to catch the falling fines. The fines, upon contact with the desensitizing material, are rendered non-combustible. When water is used as the desensitizing material in the receptacle, means may be provided to cool the water so as to reduce the amount of its vaporization.

Accordingly, an object of this invention is to provide a method and apparatus for desensitizing fines created during the drying of charcoal briquettes.

Another object of this invention is to provide a method and apparatus for desensitizing charcoal briquette fines by causing the fines to fall into a receptacle containing a material which, upon contact with the fines, causes the fines to become non-ignitable.

Still another object of this invention is to provide a method and apparatus for desensitizing charcoal briquette fines by causing said fines to fall into a receptacle containing water.

Other objects of this invention will become apparent upon a reading of the invention's description.

BRIEF DESCRIPTION OF THE DRAWINGS

A preferred embodiment has been chosen for purposes of illustration and description wherein:

FIG. 1 is a side elevation of the apparatus of this invention shown with parts thereof in section.

FIG. 2 is a sectional view taken along line 2—2 of FIG. 1.

FIG. 3 is a sectional view taken alonge line 3—3 of FIG. 1.

FIG. 4 is a schematic view of specific components of the apparatus of this invention.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Constituting a part of the illustrated embodiment of this invention is a housing 10 which supports a drying furnace 12 having an upper cool air return duct 14 and an innerconnected lower hot air duct 16. A heat source 18, which may be gas-fed, is positioned within the forced air furnace 12 adjacent hot air duct 16 and serves to heat the cooler air returned through duct 14. A blower 20 is also included in furnace 12 and serves to circulate air through heat source 18 and ducts 14 and 16. Hot air duct 16 is preferably defined by a top wall 22 and housing side walls 24. A roller 26 is journaled in side walls 24 of housing 10 at each end thereof. An endless belt 28 is trained about roller 26 with its upper run 30 serving to define the lower wall of hot air duct 16. Belt 28 has a plurality of openings formed therein which are smaller than the size of the briquettes carried thereupon, and yet large enough to permit the fines from the briquettes to drop freely therethrough. Such a belt of this nature is preferably of the chain-link or mesh type having openings therein approximately three-quarters inch in diameter. Belt 28 is preferably driven by a motor 32 which is drive-connected by a chain and sprocket connection 34 to one of the rollers 26.

Housing 10 includes end walls 34 and a bottom wall 36 which in association with side wall 24 define a receptacle 38 positioned below belt 28. Receptacle 38 preferably contains a desensitizing material, such as water 39, which, upon contact with fines 40 falling from briquettes 42 carried by belt 28, causes the fines to be rendered non-ignitable.

The temperature in furnace 12 may be as high as 500° F. and so during the use of the furnace it is preferable to maintain a water depth of approximately 6 inches within receptacle 38. In order to reduce the rate of evaporation of water 39 in receptacle 38 and to maintain the temperature of the water below boiling, a cooling coil 44, having a plurality of return bent runs, is disposed in the water, adjacent the bottom wall 36 of receptacle 38. Cooling coil 44, containing a refrigerant, is connected to refrigeration components 46, which may include an evaporator, condenser, and compressor. A thermostat 48, shown schematically in FIG. 4, is operatively connected to refrigerator components 46 and extends into receptacle 38 below the water level thereof. Thermostat 48 monitors the temperature of water 39 and regulates refrigerator components 46 so as to maintain the water temperature preferably between 40° and 100° F.

In order to replenish the water in receptacle 38 which is lost by evaporation, a conduit 52 having a valve 54 therein interconnects receptacle 38 with a water supply source 50. Valve 54 is regulated by a float 56 which is supported by water 39 and which serves to open valve 54 when a predetermined low water level is reached in receptacle 38, and then to close valve 54 when a predetermined high water level is reached. To ensure that water 39 in receptacle 38 is uniformly cooled by refrigeration components 46 and associated coil 44, a pump 58, shown schematically in FIG. 4, is connected by conduits 60 to receptacle 38 and serves to circulate water 39 within the receptacle. After a period of briquette drying, receptacle 38 may be drained by means of drain valve 62, and the collected fines therein removed by flushing. The receptacle then is filled with fresh water. Side walls 24, end walls 34 and bottom wall 36 of receptacle 38 are preferably constructed from stainless steel or similar non-corrosive material. It is to be understood that the desensitizing material in receptacle 38 need not be limited to water.

During the manufacturing process, the newly molded briquettes 42 pass down a chute 64 and are deposited upon one end of the upper run 30 of belt 28. The briquettes then are carried by belt 28 into furnace 12. The temperature of the furnace air and the speed of the belt 28 are correlated so that a desired amount of moisture is removed from the briquettes by the time the briquettes reach the opposite end of belt run 30. There the briquettes fall into a second chute 66 where they are carried to a packaging or bagging area. During the pass of the briquettes 42 through furnace 12, fines 40 and pieces of broken briquettes fall through the openings in belt 28 and into receptacle 38 where contact is made with water 39.

It is to be understood that this invention is not to be limited to the details herein given, but may be modified within the scope of the appended claims.

What I claim is:

1. Apparatus for desensitizing fines produced during the drying of charcoal briquettes comprising:
   means for supporting said briquettes during drying, said support means having openings therein through which said fines may fall,
   a receptacle positioned under said support means for catching said fines, and
   material in said receptacle which is contacted by said fines and as a result causes said desensitizing thereof.

2. The apparatus of claim 1, wherein said material is water.

3. The apparatus of claim 2, including means for cooling said water.

4. The apparatus of claim 2, including a water source connected to said receptacle, valve means regulating the flow of water from said water source into said receptacle.

5. The apparatus of claim 4, including means responsive to the level of said water in said receptacle for actuating said valve means.

6. The apparatus of claim 1, wherein said support means is a run of an endless power driven belt.

7. A method of desensitizing fines produced during the drying of charcoal briquettes in a furnace comprising the steps:
   a. supporting said briquettes while within said furnace upon means having openings therein through which said fines may fall,
   b. providing a receptacle and filling said receptacle with a material which upon contact with said fines causes said desensitizing thereof, and
   c. positioning said receptacle under said support means to catch said fines.

8. The method of claim 7, wherein said material is water and including the step of cooling said water to prevent excessive evaporation thereof.

9. The method of claim 8, including the step of replenishing the water in said receptacle lost by evaporation.

* * * * *